(12) United States Patent
Ono (10) Patent No.: US 11,106,001 B2
(45) Date of Patent: Aug. 31, 2021

(54) LENS BARREL

(71) Applicant: CANON KABUSHIKI KAISHA, Tokyo (JP)

(72) Inventor: Shuhei Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 16/291,393

(22) Filed: Mar. 4, 2019

(65) Prior Publication Data

US 2019/0278049 A1    Sep. 12, 2019

(30) Foreign Application Priority Data

Mar. 8, 2018 (JP) .............................. JP2018-042444

(51) Int. Cl.
*G02B 7/04* (2021.01)
*G02B 5/00* (2006.01)
*G02B 27/10* (2006.01)
*G02B 27/02* (2006.01)

(52) U.S. Cl.
CPC .............. *G02B 7/04* (2013.01); *G02B 5/005* (2013.01); *G02B 27/02* (2013.01); *G02B 27/10* (2013.01)

(58) Field of Classification Search
CPC .......... G02B 7/04; G02B 27/10; G02B 27/02; G02B 5/005; G02B 7/10
See application file for complete search history.

(56) References Cited

U.S. PATENT DOCUMENTS

2007/0019950 A1    1/2007  Tanaka
2010/0166402 A1    7/2010  Lee et al.

FOREIGN PATENT DOCUMENTS

| CN | 1702486 A | 11/2005 |
|---|---|---|
| CN | 201273952 Y | 7/2009 |
| CN | 102385133 A | 3/2012 |
| CN | 102809796 A | 12/2012 |
| JP | H10-274734 A | 10/1998 |
| JP | H11-218669 A | 8/1999 |
| JP | 2000-147355 A | 5/2000 |
| JP | 2007-33699 A | 2/2007 |
| JP | 2014-191164 A | 10/2014 |
| JP | 2016-099538 A | 5/2016 |

OTHER PUBLICATIONS

European Application No. 19160807.4-1020, The extended European search report, dated Aug. 8, 2019.

*Primary Examiner* — Tuyen Tra
(74) *Attorney, Agent, or Firm* — Canon U.S.A., Inc. IP Division (57) ABSTRACT

A lens barrel according to an embodiment of the present invention has a fixing member; an aperture unit that moves forward and backward in the optical axis direction by a zooming operation; a plurality of optical members that move forward and backward in the optical axis direction by a zooming operation; and an aperture FPC that connects a substrate held by the fixing member to the aperture unit. The aperture FPC bends around an axis line extending in the vertical direction in the normal attitude state and is arranged in a position overlapping a drive unit of the aperture unit on a plane perpendicular to the optical axis.

6 Claims, 8 Drawing Sheets

LENS BARREL

BACKGROUND OF THE INVENTION

Field of the Invention

The present invention relates to a lens barrel in which a plurality of optical elements move forward and backward in the optical axis direction during a zooming operation, mainly to a lens barrel in which an electric unit such as an aperture unit, a vibration isolation unit, or the like moves forward and backward in the optical axis direction during a zooming operation.

Description of the Related Art

In a lens barrel in which an electric unit such as an aperture unit, a vibration isolation unit, or the like moves forward and backward in the optical axis direction by a zooming operation, the moving electric unit and a control substrate held by a fixing member are required to be connected to each other by using a flexible printed circuit substrate (hereinafter, FPC). Since being bent as the electric unit moves, the FPC repeatedly receives a bending load. Since the performance of the electrical connection may be reduced in such a way, durability against bending is required.

Accordingly, to improve bending durability of the FPC, a configuration in which a bending diameter of the FPC is increased in a lens barrel in which an electric unit moves forward and backward in the optical axis direction may be considered. Further, in order to improve bending durability of the FPC, there is a configuration in which an FPC of a shutter unit that moves forward and backward in the optical axis direction is bent in the optical axis direction such that the curvature is substantially constant along the front side or the rear side of the shutter unit (for example, see Japanese Patent Application Laid-Open No. 2007-33699).

In the configuration in which the bending diameter of the FPC is increased, however, the device increases in size as the bending diameter of the FPC increases. Further, in the configuration disclosed in Japanese Patent Application Laid-Open No. 2007-33699, the device increases in size when a moving distance of the shutter unit is increased.

Accordingly, the object of the present invention is, in the lens barrel in which the electric unit moves forward and backward in the optical axis direction, to provide a lens barrel that can improve the bending durability of the FPC connected to an electric unit without increasing the size of the device.

SUMMARY OF THE INVENTION

A lens barrel of the present invention has: a fixing member; an aperture unit that moves forward and backward in the optical axis direction by a zooming operation; a plurality of optical members that move forward and backward in the optical axis direction by a zooming operation; and a flexible printed circuit board that connects a substrate held by the fixing member to the aperture unit. The flexible printed circuit board bends around an axis line extending in a vertical direction in a normal attitude state and is arranged in a position overlapping a drive unit of the aperture unit on a plane perpendicular to an optical axis.

Further features of the present invention will become apparent from the following description of exemplary embodiments with reference to the attached drawings.

DESCRIPTION OF THE EMBODIMENTS

A preferable embodiment of the present invention will be described in detail below based on the attached drawings.

Entire Structure of Lens Barrel

A lens barrel according to a first embodiment of the present invention will be described below with reference to FIG. 1 to FIG. 7.

Figure 1:
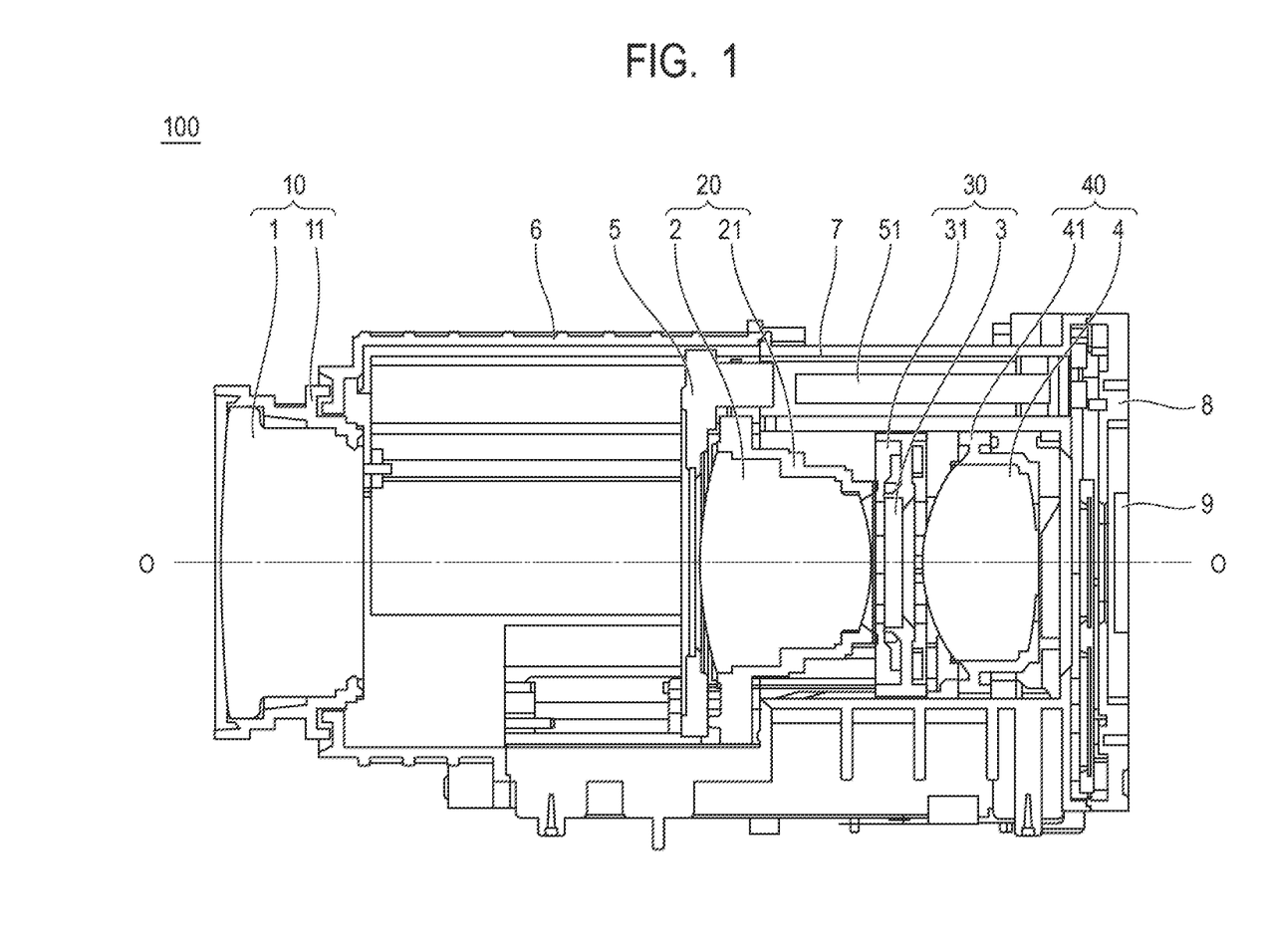
FIG. 1 is a sectional view of a lens barrel at a WIDE position according to an embodiment of the present invention.

FIG. 1 is a sectional view of a lens barrel 100 at a WIDE position according to the embodiment of the present invention. An optical system of the lens barrel 100 is formed of a first lens group 10, a second lens group 20, a third lens group 30, and a fourth lens group 40 as an example of multiple optical members, an image of a light passing through these lens groups is formed by an image pickup device 9 arranged on an optical axis O, and thereby an image is captured.

The image pickup device 9 is fixed to a rear casing member 7 via an image pickup device holding member 8. The first lens group 10 is formed of a first lens 1 and a first group lens frame 11, and the first group lens frame 11 holding the first lens 1 is fixed to the front casing member 6. The second lens group 20, which is formed of a second lens 2 and a second group lens frame 21, is held so as to be movable forward and backward in the optical axis direction in the front casing member 6 and the rear casing member 7. The second lens 2 is a lens related to a zooming operation of the lens barrel 100, and forward and backward movement of the second lens group 20 in the optical axis direction causes a zooming operation of the lens barrel 100. The third lens group 30, which is formed of a third lens 3 and a third group lens frame 31, is held so as to be movable forward and backward in the optical axis direction in the front casing member 6 and the rear casing member 7. The third lens 3 is a lens related to a focusing operation of the lens barrel 100, and forward and backward movement of the third lens group 30 in the optical axis direction causes a zooming operation of the lens barrel 100. The fourth lens group 40, which is formed of a fourth lens 4 and a fourth group lens frame 41, is held so as to be movable forward and backward in the optical axis direction in the front casing member 6 and the rear casing member 7. The fourth lens 4 is a lens related to a zooming operation of the lens barrel 100, and forward and backward movement of the fourth lens group 40 in the optical axis direction causes a zooming operation of the lens barrel 100.

An aperture unit 5 adjusts a light amount of the lens barrel 100 by changing an opening diameter of the aperture unit 5. The aperture unit 5 changes the opening diameter by driving a blade member by an aperture drive unit 52. The aperture unit 5 is held by the second group lens frame 21 and moves forward and backward in the optical axis direction together with the second group lens frame 21 by a zooming operation of the lens barrel 100.

Figure 2:
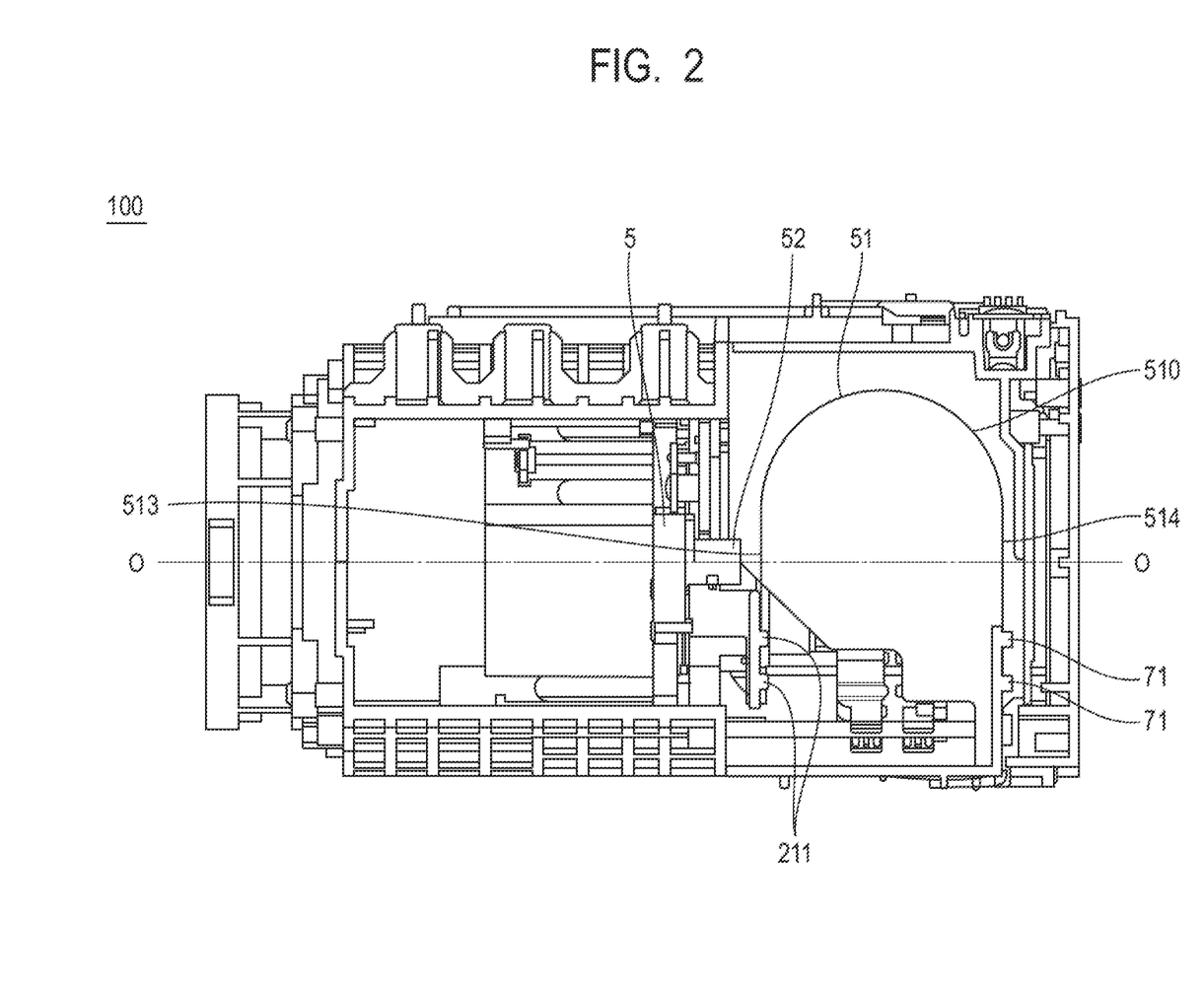
FIG. 2 is a sectional view of a main portion of the lens barrel at the WIDE position according to the embodiment of the present invention.

As illustrated in FIG. 2, an aperture FPC 51 used for transmitting input from the outside is electrically connected to the aperture chive unit 52. The aperture FPC 51 (flexible printed circuit board) is extracted from the inside of the lens barrel 100 to the outside of the rear casing member 7 and connected to an external power source.

Structure of Aperture FPC 51

Figure 3:
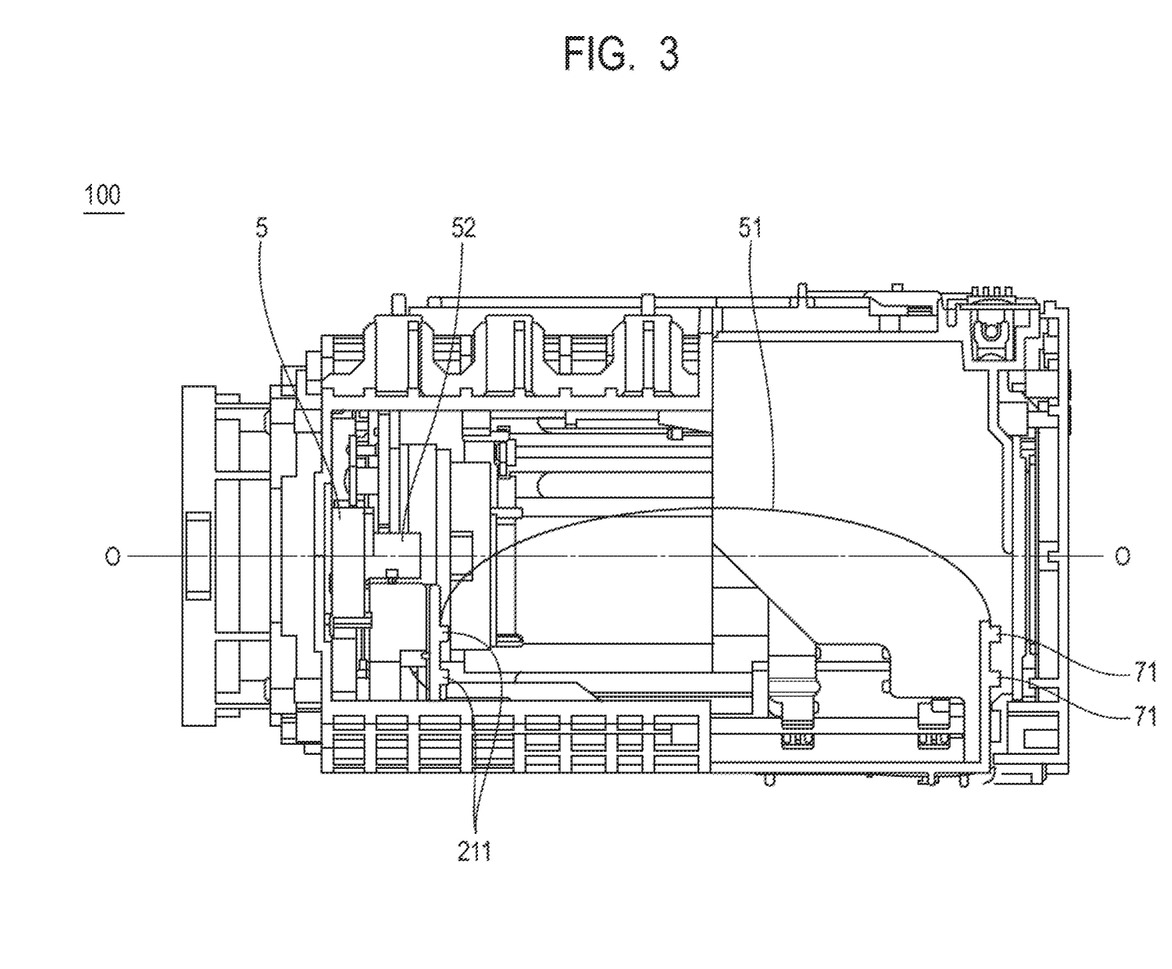
FIG. 3 is a sectional view of a main portion of the lens barrel at the TELE position according to the embodiment of the present invention.
Figure 4:
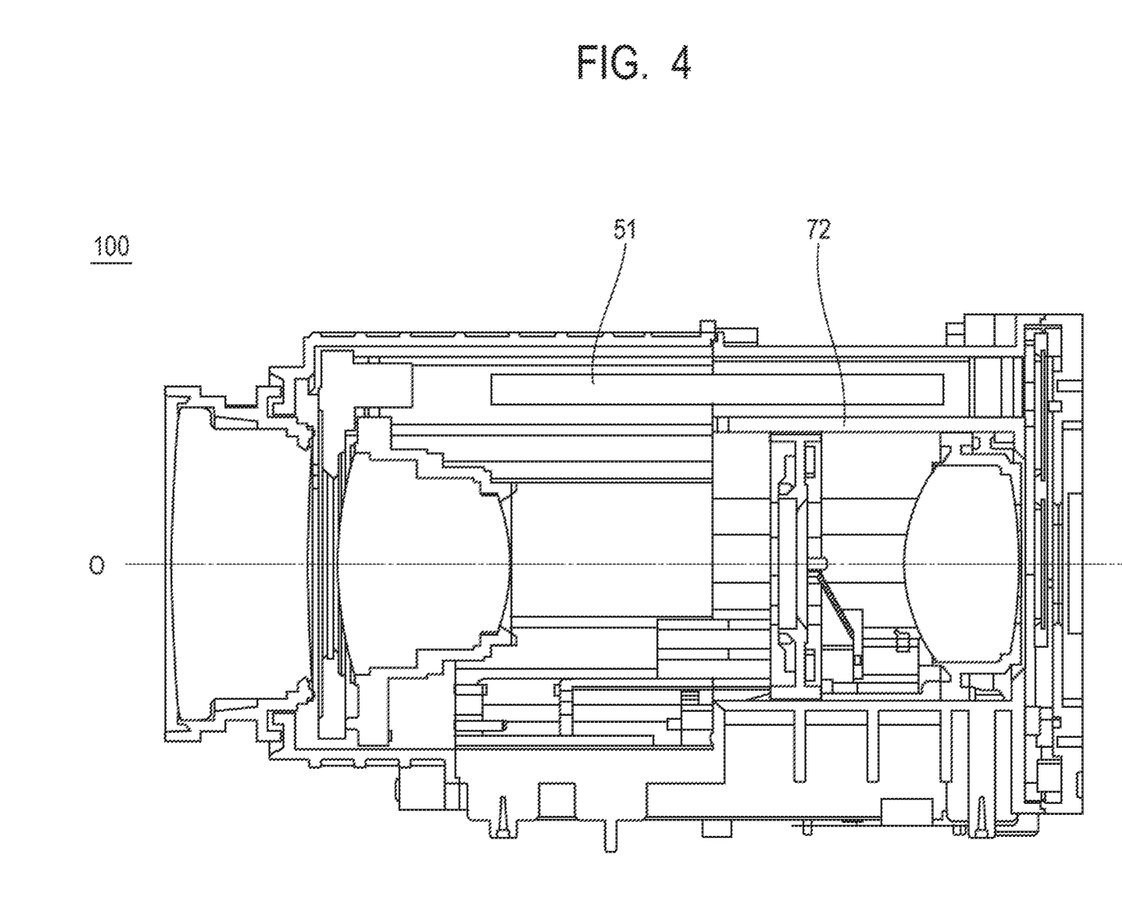
FIG. 4 is a sectional view of a lens barrel at a TELE position according to the embodiment of the present invention.

FIG. 2 is a cross sectional view of the lens barrel 100 at the WIDE position according to the embodiment of the present invention and a diagram viewed downward in the vertical direction in the normal attitude state of the lens barrel 100. FIG. 3 is a sectional view of the lens barrel 100 at a TELE position according to the embodiment of the present invention and a diagram viewed downward in the vertical direction in the normal attitude state of the lens barrel 100 as with FIG. 2. FIG. 4 is a sectional view of the lens barrel 100 at the TELE position according to the embodiment of the present invention.

The lens barrel 100 is configured such that the second lens group 20 is located on the rearmost side in the optical axis direction in the WIDE state and the second lens group 20 is located on the frontmost side in the optical axis direction in the TELE state. Specifically, the second lens group 20 is located closer to the image pickup device 9 side in the optical axis direction when the lens barrel 100 is in the WIDE state as illustrated in FIG. 2 than when the lens barrel 100 is in the TELE state. Further, the second lens group 20 is located closer to the first lens group 10 side when the lens barrel 100 is in the TELE state as illustrated in FIG. 3 than when the lens barrel 100 is in the WIDE state.

The aperture FPC 51 is a member having an elongated shape, and one end thereof is fixed to a moving group-side FPC holding portion 211 (first fixing portion) of the second group lens frame 21 near the aperture drive unit 52. Further, the other end thereof is fixed to a fixed group-side FPC holding portion 71 (second fixing portion) of the rear casing member 7. Therefore, the aperture FPC 51 will repeat the bending motion as the second lens group 20 moves forward and backward in the optical axis direction.

Further, the positional relationship between the fixed group-side FPC holding portion 71 and the moving group-side FPC holding portion 211 is such that the moving group-side FPC holding portion 211 is in the front and the fixed group-side FPC holding portion 71 is in the rear in the optical axis direction. For the horizontal direction, the moving group-side FPC holding portion 211 and the fixed group-side FPC holding portion 71 are located on the same side of a region divided by a plane that includes the optical axis and extends in the vertical direction in the normal attitude state. Further, for the horizontal direction, the moving group-side FPC holding portion 211 and the fixed group-side FPC holding portion 71 are arranged at a position further away from the optical axis within a range not to come out of the casing of the lens barrel 100. Further, an FPC wall portion 72 extending in the optical axis direction is provided to the rear casing member 7 as illustrated in FIG. 4. Therefore, even when the aperture FPC 51 is bent in the vertical direction, contact of the aperture FPC 51 to the third lens group 30 or the fourth lens group 40 can be suppressed.

The aperture FPC 51 is formed of a bending portion 510 and a front-side straight portion 513 and a rear-side straight portion 514 located in the front and in the rear of the bending portion 510 when the lens barrel 100 is in the WIDE state. The front-side straight portion 513 and the rear-side straight portion 514 are arranged substantially in parallel. Further, when the lens barrel 100 is in the WIDE state, the front-side straight portion 513 and the rear-side straight portion 514 have the longitudinal direction in a direction parallel to the horizontal direction in a normal attitude state of the lens barrel 100. Further, the bending portion 510 has a shape so as to bend around an axis line extending in the vertical direction in the normal attitude state of the lens barrel 100. Further, the aperture FPC 51 has the longitudinal direction in the optical axis direction when the lens barrel 100 is in the TELE state.

Further, a space for accommodating the aperture FPC 51 substantially corresponds to a moving stroke region of the second lens group 20. Therefore, the lens barrel 100 is not required to be increased in size for accommodation.

Further, the aperture FPC 51 has the largest bending in the WIDE state. Although the aperture FPC 51 is required to have a certain degree of bend even in the TELE state in order to avoid an excessive load, the aperture FPC 51 is required to have a greater bending in the WIDE state, and therefore the space required for accommodation becomes too large. However, with the moving group-side FPC holding portion 211 and the fixed group-side FPC holding portion 71 being arranged in such a positional relationship described above, the space in the horizontal space of the lens barrel 100 can be fully utilized. Therefore, the lens barrel 100 is not required to be increased in size more than is necessary.

Holding Structure of Aperture FPC 51

Figure 5:
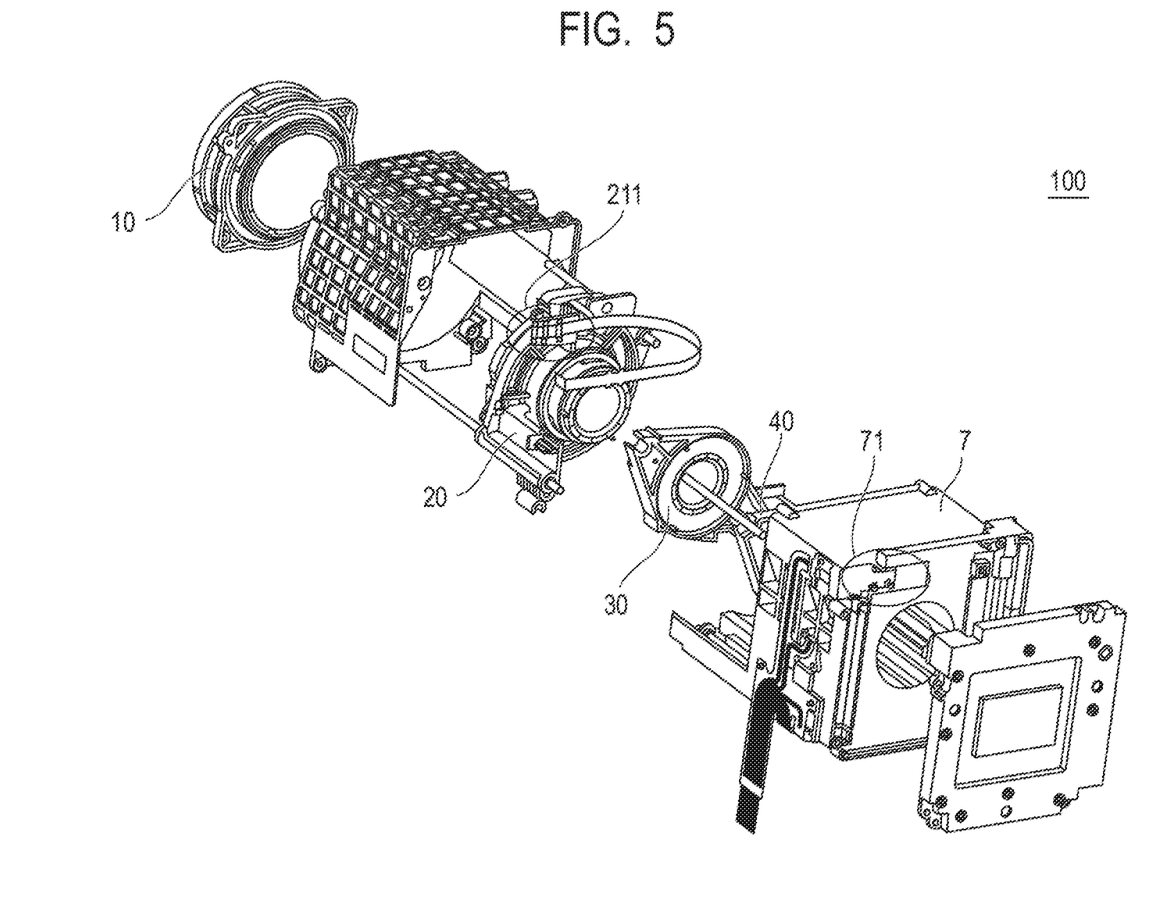
FIG. 5 is an exploded perspective view of the lens barrel according to the embodiment of the present invention.

As described above, one end of the aperture FPC 51 is fixed to the moving group-side FPC holding portion 211 of the second group lens frame 21, and the other end is fixed to the fixed group-side FPC holding portion 71 of the rear casing member 7. Details of this holding structure will be described below. FIG. 5 is an exploded perspective view of the lens barrel according to the embodiment of the present invention.

Figure 6:
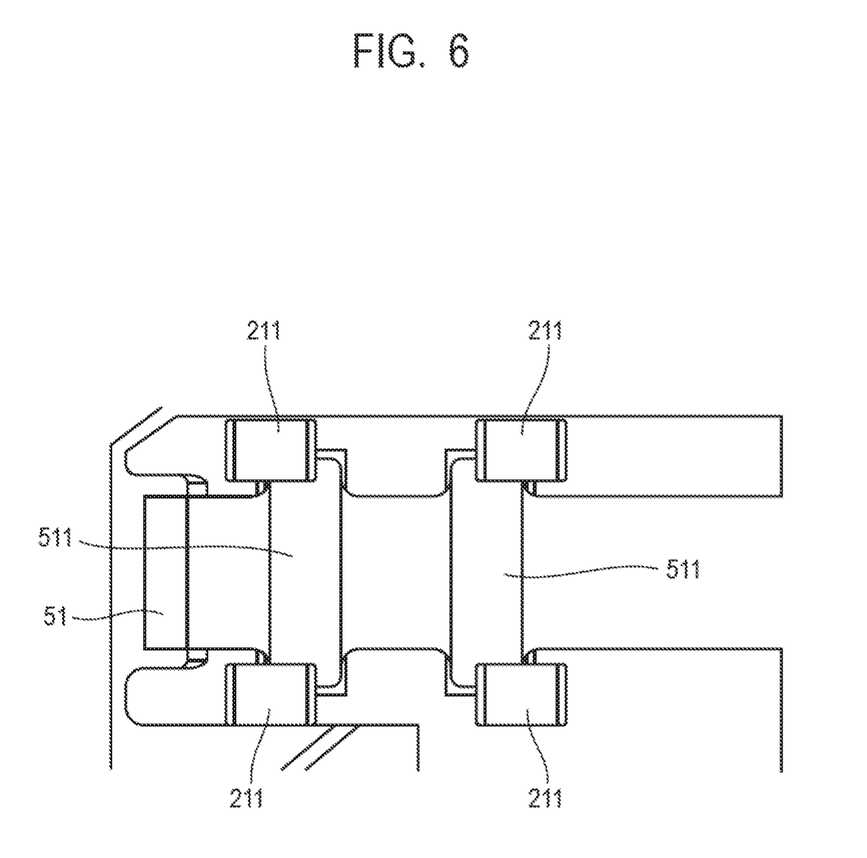
FIG. 6 is a detail view of a moving group-side FPC holding portion of the lens barrel according to the embodiment of the present invention.

FIG. 6 is a detail view of a moving group-side FPC holding portion of the lens barrel according to the embodiment of the present invention. Moving group engagement portions 511 provided to the aperture FPC 51 are formed of two reinforcing plates that have a shape protruding from the external shape of the aperture FPC 51 and are arranged next to each other in the longitudinal direction of the aperture FPC 51. Further, the moving group-side FPC holding portions 211 provided to the second group lens frame 21 are formed of four claws, which are engaged with the moving group engagement portion 511 two by two, and thereby hold the aperture FPC while restricting the position and attitude thereof.

Figure 7:
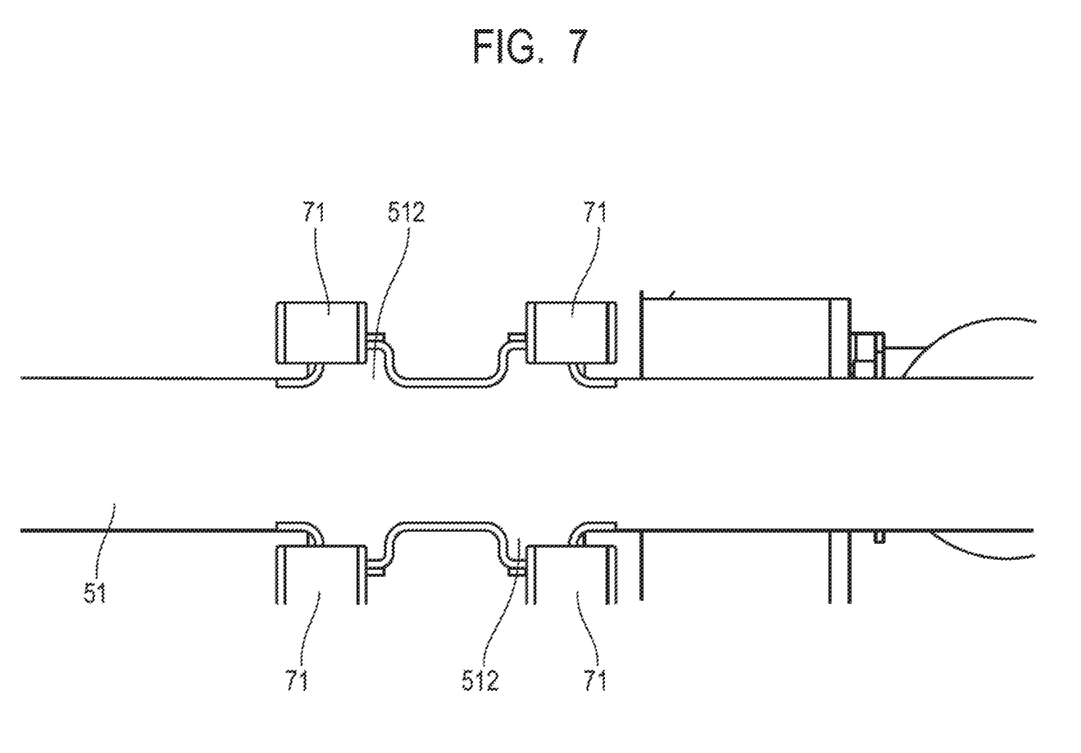
FIG. 7 is a detail view of a fixed group-side FPC holding portion of the lens barrel according to the embodiment of the present invention.

FIG. 7 is a detail view of a fixed group-side FPC holding portion of the lens barrel according to the embodiment of the present invention. Fixed group engagement portions 512 provided to the aperture FPC 51 are formed of two reinforcing plates that have a shape protruding from the external shape of the aperture FPC 51 and are arranged next to each other in the longitudinal direction of the aperture FPC 51. Further, the fixed group-side FPC holding portions 71 provided to the rear casing member 7 are formed of four claws, which are engaged with the fixed group engagement portion 512 two by two, and thereby holds the aperture FPC while restricting the position and attitude thereof.

Therefore, since the aperture FPC 51 is held while the position and attitude are restricted by the moving group engagement portions 511 and the fixed group engagement portions 512, respectively, the horizontal attitude is always held even when the second lens group 20 moves forward and backward, and the vibration in the vertical direction can be suppressed.

Further, the aperture FPC 51 is arranged so as not to come into contact with another member except in the near area of the moving group-side FPC holding portion and the near area of the fixed group-side FPC holding portion. Therefore, abrasion of the aperture FPC 51 due to contact with the other member can be suppressed.

Arrangement of Aperture FPC 51

Figure 8:
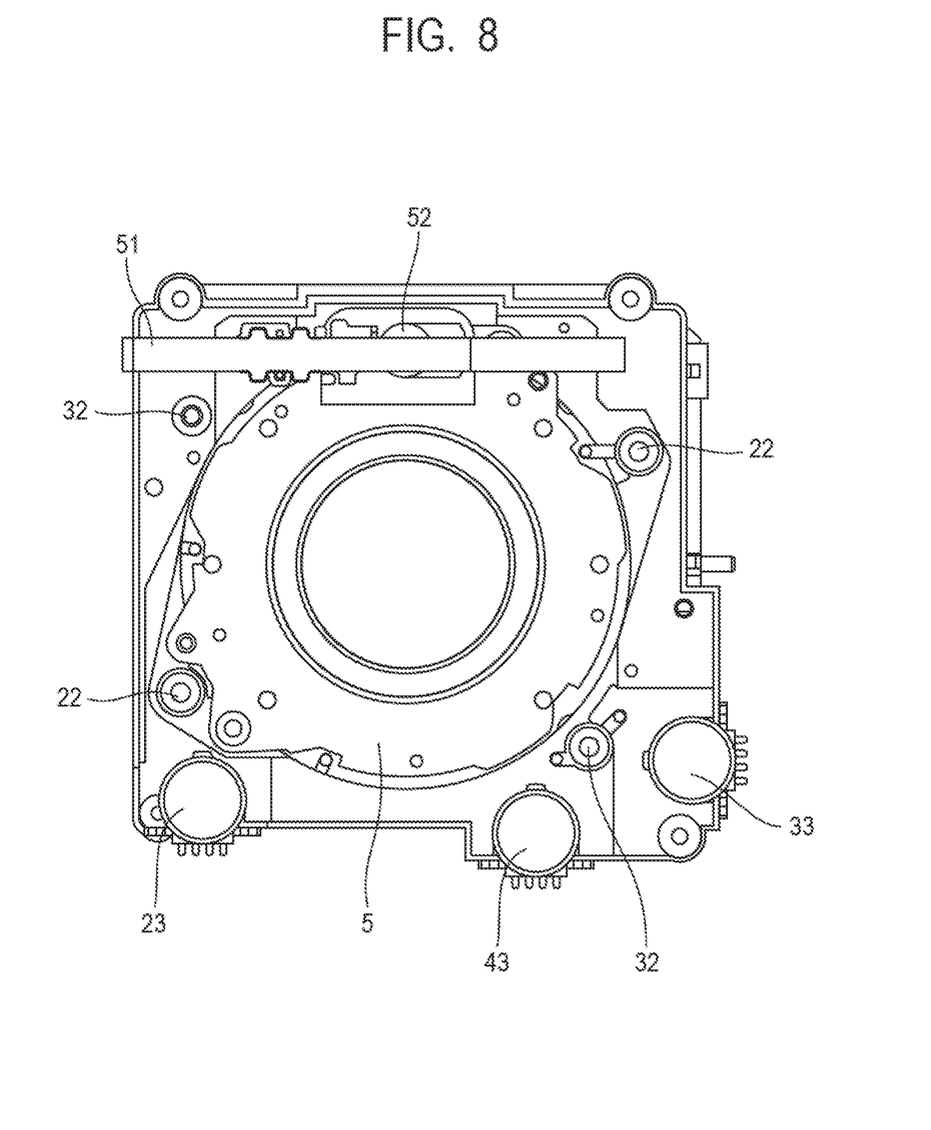
FIG. 8 is an exploded view of the main portion of the lens barrel when viewed from an optical axis direction according to the embodiment of the present invention.

FIG. 8 is an exploded view of the main portion of the lens barrel when viewed from the optical axis direction according to the embodiment of the present invention. Elements 22, which are engaged with the second group lens frame 21, are second group support members that guide and hold the second lens group 20 so as to be movable forward and backward in the optical axis direction. An element 23, which is engaged with the second group lens frame 21, is a second group drive unit that causes the second lens group 20 to move forward and backward in the optical axis direction.

Elements 32, which are engaged with the third group lens frame 31 and the fourth group lens frame 41, are third group and fourth group support members that guide and hold the third lens group 30 and the fourth lens group 40 so as to be movable forward and backward in the optical axis direction. An element 33, which is engaged with the third group lens frame 31, is a third group drive unit that causes the third lens group 30 to move forward and backward in the optical axis direction. An element 43, which is engaged with the fourth group lens frame 41, is a fourth group drive unit that causes the fourth lens group 40 to move forward and backward in the optical axis direction.

The size of the projected area on the vertical plane in the optical axis direction of the lens barrel 100 depends on the external shape of the aperture unit to a large degree. Further, since extending in the optical axis direction, the support members 22 and 32 and the drive units 23, 33, and 43 of the lens motion groups are often unable to be arranged to overlap with the aperture unit on the vertical plane in the optical axis direction of the aperture unit. Therefore, for the arrangement of the support members 22 and 32 and the drive units 23, 33, and 43 of the lens motion groups on the vertical plane in the optical axis direction, there are many restrictions on the layout so as not to increase the size of the lens barrel 100. Accordingly, the arrangement is required to be within a limited space near the external shape of the aperture unit in the optical axis direction. Furthermore, when another space for accommodating the FPC of the aperture unit is further provided, this results in a convex shape with respect to the external shape of the lens barrel. The drive unit for the aperture unit is generally convex from the external shape of the aperture unit in many cases. However, since members extending in the optical axis direction are unable to be arranged in such a position as described above, a dead space often occurs in the conventional art.

In the lens barrel 100 of the present invention, the arrangement of the aperture drive unit 52 and the aperture FPC 51 of the aperture unit 5 so as to overlap each other on the vertical plane m the optical axis direction effectively utilizes such a dead space and prevents an increase in size of the device. With such a configuration, it is possible to increase the curvature of the bending portion 510 of the aperture FPC 51 without increasing the external shape of the lens barrel 100 in size and to improve durability of the FPC for bending without increasing the device in size.

As described above, in a lens barrel in which an electric unit moves forward and backward in the optical axis direction, bending durability of the FPC connected to the electric unit can be improved without increase in size of the device.

Although the preferred embodiments of the present invention have been described above, the present invention is not limited to these embodiments, and various modifications and changes are possible within the scope of the spirit thereof. Further, as long as the design function is considered, the embodiment is not limited thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-042444, filed Mar. 8, 2018, which is hereby incorporated by reference herein in its entirety.

What is claimed is:

1. A lens barrel comprising:
   a housing that houses a lens;
   a lens holding frame that holds the lens, and is disposed in the housing and movable in an optical axis direction of the lens;
   an aperture unit that has a drive unit held by the lens holding frame;
   a substrate that is held by the housing; and
   a flexible printed circuit board that connects the substrate to the drive unit of the aperture unit,
   wherein the flexible printed circuit board
   bends in an arc shape along a plane substantially parallel to the optical axis of the lens so that a bent portion of the flexible printed circuit board approaches an inner wall of the housing as the lens holding frame moves from an object side to an imager side in the optical axis direction of the lens, and
   is arranged in a position overlapping with the drive unit of the aperture unit when viewed in the optical axis direction of the lens.

2. The lens barrel according to claim 1, wherein the flexible printed circuit board is arranged in a position not overlapping the lens when viewed in the optical axis direction of the lens.

3. The lens barrel according to claim 1, wherein one part of the flexible printed circuit board is fixed to a first fixing portion of the lens holding frame, and the other part of the flexible printed circuit board is fixed to a second fixing portion of the housing, and
   wherein the first fixing portion and the second fixing portion are arranged on a straight line substantially parallel to the optical axis.

4. The lens barrel according to claim 3, wherein each of the first fixing portion and the second fixing portion has two fixing portions in a longitudinal direction of the flexible printed circuit board when the flexible printed circuit board is bent the most.

5. The lens barrel according to claim 3, wherein the flexible printed circuit board is arranged so as not to come into contact with another member except in a near area of the first fixing portion or a near area of the second fixing portion.

6. The lens barrel according to claim 3, wherein the lens holding frame comprises:
   a first lens holding frame for holding the aperture unit; and
   a second lens holding frame arranged on the imager side of the first lens holding frame, and disposed between the first fixing portion and the second fixing portion when the first lens holding frame is placed in the closest position to the imager side and the flexible printed circuit board is bent the most.

* * * * *